(12) United States Patent
Mallada et al.

(10) Patent No.: US 8,939,259 B2
(45) Date of Patent: Jan. 27, 2015

(54) WIND TURBINE LUBRICATION SYSTEM

(75) Inventors: José Luis Román Mallada, Barcelona (ES); Daniel Castell Martinez, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 712 days.

(21) Appl. No.: 13/127,621

(22) PCT Filed: Nov. 5, 2009

(86) PCT No.: PCT/EP2009/064682
§ 371 (c)(1),
(2), (4) Date: May 4, 2011

(87) PCT Pub. No.: WO2010/052271
PCT Pub. Date: May 14, 2010

(65) Prior Publication Data
US 2011/0217173 A1    Sep. 8, 2011

(30) Foreign Application Priority Data
Nov. 10, 2008   (EP) ..................... 08168773

(51) Int. Cl.
| F16H 57/04 | (2010.01) |
| F16H 1/00 | (2006.01) |
| F03D 11/00 | (2006.01) |

(52) U.S. Cl.
CPC ........ F03D 11/0008 (2013.01); F16H 57/0412 (2013.01); F16H 57/0441 (2013.01); F16H 57/0486 (2013.01); Y02E 10/722 (2013.01)
USPC .......................... 184/6.12; 184/4; 416/170 R

(58) Field of Classification Search
CPC . F03D 1/0008; F16H 57/0412; F16H 57/441; F16H 57/048; Y02E 10/722
USPC ............ 184/4, 6.12; 416/170 R, 174; 417/53, 417/416
See application file for complete search history.

(56) References Cited

U.S. PATENT DOCUMENTS

| 1,620,145 | A | | 3/1927 | Turner |
| 3,846,042 | A | * | 11/1974 | Keene ........................... 416/110 |
| 8,365,866 | B2 | * | 2/2013 | Ciszak et al. ................. 184/6.12 |
| 2009/0191060 | A1 | * | 7/2009 | Bagepalli et al. ............. 416/174 |

(Continued)

FOREIGN PATENT DOCUMENTS

| CN | 2083210 U | 8/1991 |
| CN | 2799889 Y | 7/2006 |

(Continued)

OTHER PUBLICATIONS

Machine translation of the text of JP-2007-224879A.*

(Continued)

*Primary Examiner* — William E Dondero
*Assistant Examiner* — Robert T Reese
(74) *Attorney, Agent, or Firm* — Squire Patton Boggs (US) LLP

(57) ABSTRACT

A wind turbine lubrication system comprising a pump for pumping lubricant through a lubrication circuit, said pump being driven by a power-take-off from the drive train of the wind turbine, characterized in that said pump for pumping lubricant drives at least a first hydraulic motor providing mechanical power to a first wind turbine auxiliary component.

18 Claims, 4 Drawing Sheets

(56) References Cited

U.S. PATENT DOCUMENTS

2010/0007151 A1* 1/2010 Ciszak et al. ............ 290/55
2013/0011263 A1* 1/2013 Subramaniam et al. ...... 416/174

FOREIGN PATENT DOCUMENTS

| CN | 101025150 A | 8/2007 | |
|---|---|---|---|
| DE | 202004009387 | 8/2004 | |
| EP | 0093461 | 3/1983 | |
| EP | 0 093 461 | 11/1983 | |
| EP | 1717489 | 11/2006 | |
| EP | 1710432 | 10/2009 | |
| JP | 2007224879 | 9/2007 | |
| JP | 2007224879 A * | 9/2007 | F03D 7/04 |
| WO | 2008065088 | 6/2008 | |

OTHER PUBLICATIONS

State Int. Property Office of the People's Republic of China Notification of the First OA for appl. No. 200980144571.X, dated Jan. 4, 2013, 9 pgs.

Translation of State Int. Property Office of the People's Republic of China Notification of the First OA for appl. No. 200980144571.X, dated Jan. 4, 2013, 9 pgs.

* cited by examiner

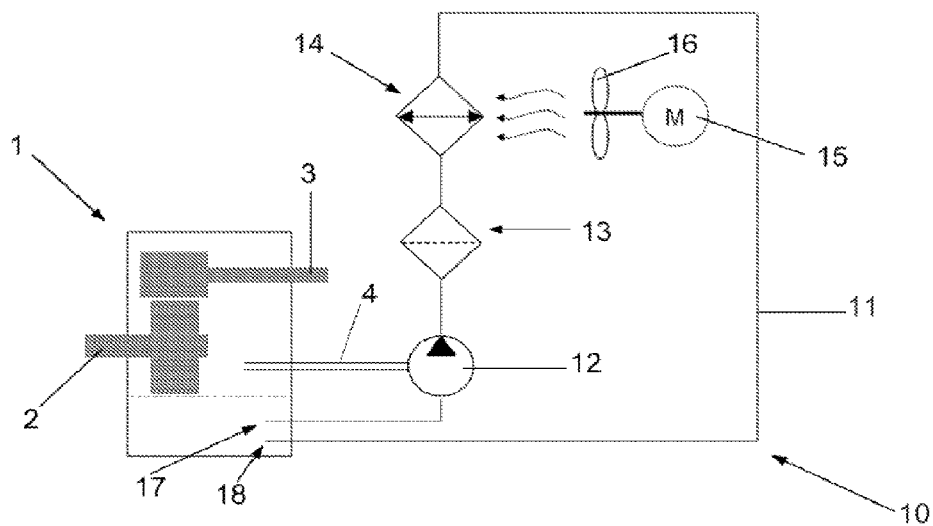
PRIOR ART          Figure 1
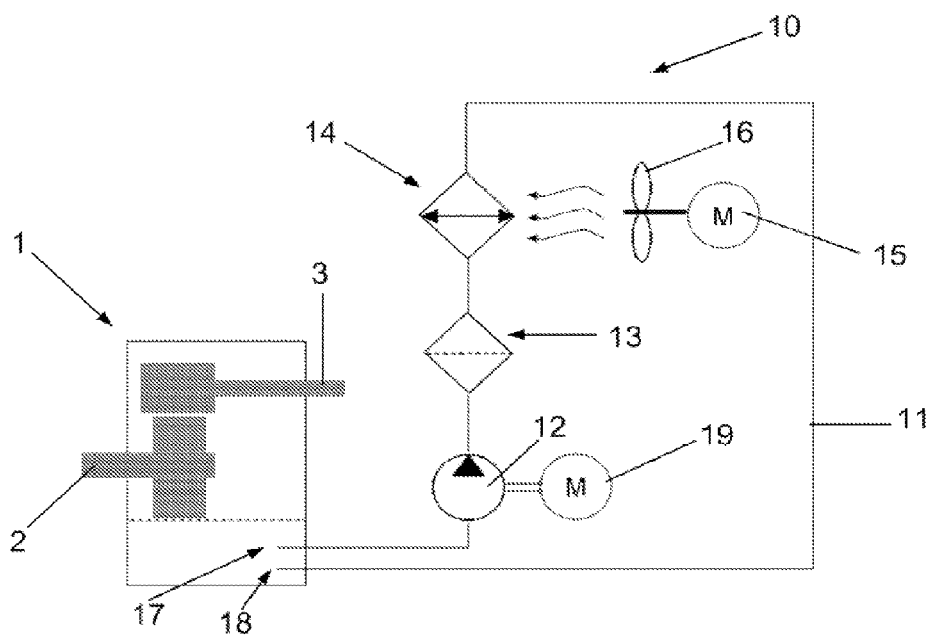
Figure 2
PRIOR ART

WIND TURBINE LUBRICATION SYSTEM

CROSS-REFERENCE TO RELATED APPLICATIONS

This application claims priority under 35 U.S.C. 371 to PCT/EP2009/064682 filed Nov. 5, 2009.

TECHNICAL FIELD

The present invention relates to a wind turbine lubrication system.

BACKGROUND OF THE INVENTION

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

In the turbines using a gearbox, a slow speed shaft (which commonly is the rotor shaft) enters the gearbox. The rotation of the slow speed shaft is transformed through suitable gearing to rotation of a high speed shaft, which drives the generator. Lubricant (which commonly is oil, possibly with additives) is provided in the gearbox to reduce friction between the gears. This improves efficiency and reduces wear of the parts. An additional function of the lubricant is to dissolve particles and to prevent corrosion.

Lubricant is normally heated up by the heat that is generated by the contact between the gears in the gearbox. The lubricant thus needs to be cooled and is generally circulated through a circuit comprising a cooler or heat exchanger. A pump is used to pump the lubricant exiting the gearbox through the cooler and then back to the gearbox.

In direct-drive wind turbines, the rotor shaft directly drives a generator rotor. Lubrication in this kind of wind turbines may be needed e.g. for the rotor shaft bearings. Cooling of lubricant is generally also required in this case.

JP2007224879 discloses a yaw drive system comprising an electric motor for rotating a nacelle. A hydraulic pump, which is driven through a connection to the gearbox provides hydraulic fluid to a brake for locking the nacelle in its position.

EP 0 093 461 discloses a lubricating oil pump, which is coupled with the rotor shaft by means of a gear wheel drive. The lubricating oil pump supplies the lubricating oil through oil ducts to bearings in a cabinet. Cooling vanes for cooling the lubricating oil are provided on the outside of the cabinet.

Other prior art systems may typically comprise an oil-air heat exchanger for cooling the lubricant. Cooling air is provided by a fan driven by an electric motor. The pump for pumping lubricant through the hydraulic circuit may be driven by another electric motor or a hydraulic motor.

Electrical motors have the disadvantage that they are big and heavy. Additionally, they require electrical supply and controls and additional protection systems. Hydraulically driven motors need hydraulic power to be generated from a hydraulic power pack from electricity. Especially in modern, large wind turbines, the motors that are required may be heavy and expensive.

An alternative, at least for the pump for pumping lubricant through the lubrication circuit, may be to use a power-take-off from the gearbox. However, such a power-take-off is relatively complex and expensive.

There thus exists a need for a cost-efficient wind turbine lubrication circuit.

SUMMARY

The object of the present invention is to provide a lubrication circuit which at least partly fulfils this need. This object is achieved by a system according to claim 1. Namely, by a wind turbine lubrication system comprising a pump for pumping lubricant through a lubrication circuit, said pump being driven by a power-take-off from the drive train of the wind turbine, characterised in that said pump for pumping lubricant drives at least a first hydraulic motor providing mechanical power to a first wind turbine auxiliary component.

Various parts of a wind turbine may need lubrication, such as the gearbox and bearings. Lubricant is pumped to and from these parts through a lubrication circuit and it may be cooled in a suitable cooler of heat-exchanger as it passes through the lubrication circuit. According to the invention, the pump is driven by a power-take-off from the drive train of the wind turbine. The same pump is used to drive at least a first hydraulic motor which provides mechanical power to a first wind turbine auxiliary component. This first auxiliary component can be any component which normally is powered using a separate electric or hydraulic motor. Examples are the yaw system, rotor pitch system, lubricant cooling system, de-icing system and lighting systems. Using a power-take-off is attractive in large wind turbines, since alternative arrangements with a dedicated motor are costly and heavy. The invention advantageously uses the power-take-off to drive an additional auxiliary component and thereby obviates another motor, thus making the lubrication circuit very cost-efficient.

In some embodiments, the wind turbine comprises a gearbox and said power-take-off is a power-take-off from said gearbox. In other embodiments, the wind turbine is a direct-drive wind turbine and the power-take-off is a power-take-off from the rotor shaft. In both types of wind turbines, the system according to the invention may be used advantageously and provide lubrication to suitable components. Especially, in the case of wind turbines comprising a gearbox, lubrication may be provided for the gearbox.

Preferably, said first wind turbine auxiliary component is a lubricant cooling system. This way, a relatively simple control over the lubrication circuit may be provided. As a wind turbine speeds up, lubricant for e.g. the gearbox has to be pumped faster through the lubrication and more cooling has to be provided to the lubricant. In this embodiment however, both these systems are automatically regulated through the power-take-off; as the wind turbine speeds up, the pump for pumping lubricant and for providing power to a cooling system automatically speeds up as well.

Optionally in this embodiment, the lubrication circuit comprises a liquid-air heat exchanger for cooling of the lubricant and said hydraulic motor drives a fan for cooling the lubricant. Within the scope of the invention, other cooling systems and methods may be provided, such as liquid-liquid heat-exchangers with an additional heat dump. A well known, reliable and relatively simple solution however is to use a liquid-air heat exchanger, in which cooling air is provided by a fan.

Preferably in this embodiment, the lubrication circuit furthermore comprises a bypass for bypassing lubricant around said heat exchanger. More preferably, such a bypass comprises a variable flow valve. The amount of lubricant passing through the bypass and through the heat-exchanger (or cooler) can be controlled with a variable flow valve. Advantageously, such a variable flow valve may have a temperature control. When the temperature of the lubricant rises and more cooling is needed, the flow through the bypass can be restricted through the valve. When less cooling is needed, the bypass may be opened more.

Optionally, said first hydraulic motor providing mechanical power to a first auxiliary component is arranged in said lubrication circuit. No separate circuit needs to be provided for the hydraulic motor. The motor may be driven by the same oil that serves as lubricant. An advantage of this embodiment is that it is relatively simple.

In other embodiments however, the hydraulic motor providing mechanical power to a first auxiliary component is arranged in a separate circuit. This separate hydraulic circuit can optionally contain a different fluid. The lubrication system according to this embodiment may be slightly more complex as a whole. However, it offers the advantage that different pressure levels may be used in the separate circuits. The pressure needed for pumping lubricant is different from the pressure needed to drive a hydraulic motor. In this embodiment, those pressure levels can be separated and a suitable pressure level can be established for each separate circuit.

In some embodiments, the pump for pumping lubricant furthermore drives a second hydraulic motor providing power to a second wind turbine auxiliary component. This way, the need for a second electric (or hydraulic) motor may be obviated. Suitable examples of first and second auxiliary components can be e.g. lubricant cooling system and yaw system or lubricant cooling system and lighting systems. Preferably, in these embodiments, the first and second hydraulic motors are arranged in separate hydraulic circuits. E.g the first hydraulic motor which drives the lubricant cooling system is provided in the lubrication circuit itself, whereas a second motor for providing power to the yaw system is provided in a separate hydraulic circuit. A vice versa arrangement is naturally also possible.

In the embodiments, wherein a single hydraulic motor is provided and it is arranged in the same lubrication circuit, a single head gear pump may be advantageously used. In all arrangements (singe hydraulic circuit or separate hydraulic circuit), a double head gear pump may be used. Gear pumps have the advantage of accurate control over the flow they produce. Additionally, they may be relatively easily driven by a power-take-off from e.g. the wind turbine gearbox. A double head gear pump is capable of delivering two separate flows and is thus especially suitable to be used when two separate hydraulic circuits are present. Also if a single hydraulic circuit is used, but it contains a separate branch, a double head gear pump is suitable. Apart from gear pumps, other types of pumps may also be used.

BRIEF DESCRIPTION OF THE SEVERAL VIEWS OF THE DRAWINGS

Particular embodiments of the present invention will be described in the following, only by way of non-limiting example, with reference to the appended drawings, in which:

FIG. 1 shows a schematic representation of a prior art wind turbine gearbox lubrication system.

FIG. 2 shows a schematic representation of another prior art wind turbine gearbox lubrication system.

DETAILED DESCRIPTION

Figure 3:
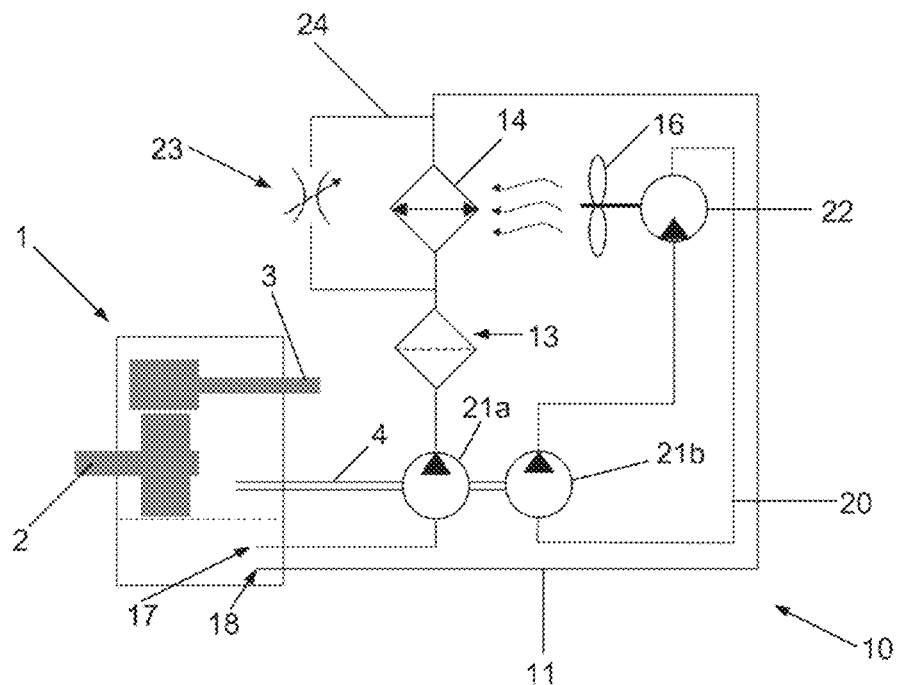
FIG. 3 shows a schematic representation of a first embodiment of a wind turbine lubrication system according to the present invention.

FIG. 1 shows a schematic representation of a prior art wind turbine gearbox lubrication system 10. The drive train of the wind turbine comprises a low speed shaft 2, a gearbox 1 and a high speed shaft 3. A power-take-off 4 from gearbox 1 drives a pump 12. Pump 12 transports lubricant to and from gearbox 1 through lubrication circuit 11. Lubricant exits the gearbox at outlet 17 and enters the gearbox at inlet 18. Circuit 11 furthermore comprises a filter 13 and a liquid-air (or oil-air) heat-exchanger 14. Cooling air is provided by fan 16, which is driven by a separate electric motor 15.

FIG. 2 shows another prior art lubrication system. It is quite similar to the one shown in FIG. 1 and same reference signs indicate same components. In this embodiment, pump 12 (which pumps lubricant through circuit 11) is not driven by a power-take-off from the gearbox. Instead, pump 12 is driven by a separate motor 19. This motor 19 may be an electrical or hydraulic motor.

FIG. 3 shows a schematic representation of a first embodiment of a wind turbine lubrication system according to the present invention. Once again, the same components have been indicated using the same reference signs. In this embodiment, a power-take-off 4 from the gearbox 1 drives a double head gear pump 21. Double head gear pump 21 comprises two gear sections 21a and 21b. Section 21a of gear pump 21 pumps lubricant through circuit 11 which extends from gearbox outlet 17 to gearbox inlet 18. Circuit 11 further comprises a suitable filter 13 and a heat-exchanger 14.

Section 21b of gear pump 21 pressurises and pumps a fluid through a separate circuit 20. This separate circuit 20 may comprise the same fluid (the lubricant) as circuit 11, but it may also comprise a different fluid. Gear pump 21 pressurises said fluid to such a level that it can drive first hydraulic motor 22, which in turn powers fan 16. Fan 16 provides the flow of cooling air in heat exchanger 14.

The lubricant circulates to and from the gearbox and passes through heat exchanger 14, such that it is cooled. In the embodiment shown in FIG. 3, circuit 11 further comprises a bypass 24 enabling lubricant to bypass the heat exchanger. The amount of fluid passing through the bypass (and the amount of fluid passing through the heat exchanger) is regulated by a variable flow valve 23. This valve 23 is suitably temperature controlled. If the temperature of the lubricant rises, more cooling is required. Valve 23 therefore has to assume a more closed position which inhibits flow through the bypass and promotes flow through the heat exchanger.

The wind turbine according to the invention does not need a separate electric motor for providing a cooling fan. It also does not need a motor for pumping the lubricant through the circuit. The power to replace both these motors is provided by a power-take-off from the gearbox. Another advantage the invention provides is that the lubricant circulation and cooling is, to a certain extent, automatically controlled through the power-take-off 4. If the speed of the wind turbine is higher, lubricant needs to be pumped through the circuit faster and it additionally needs more cooling. Since pump 21 is driven by the power-take-off 4, which speeds up when the wind turbine does, more power is automatically provided for pumping the lubricant and for driving cooling fan 16.

A particular advantage of the embodiment shown in FIG. 3, is that the pressure levels of the two hydraulic circuits (lubricant circuit 11 and circuit 20) can be regulated separately. The pressure needed to pump the lubricant through circuit 11 will generally be lower than the pressure needed to power motor 22. Because of the configuration of double head gear pump 21 and separate circuit 20, suitable pressure levels can be delivered to both circuits.

Figure 4:
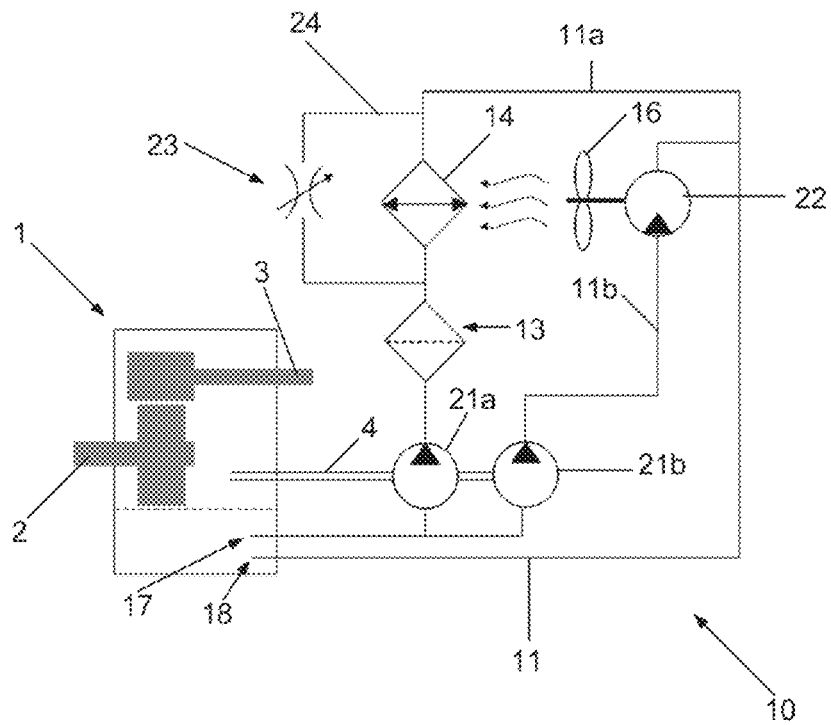
FIG. 4 shows a schematic representation of a second embodiment of a wind turbine lubrication system according to the present invention.

FIG. 4 shows another embodiment of the hydraulic circuit according to the present invention. The same elements that were shown in FIG. 3 are indicated using the same reference signs. Also in this shown embodiment, lubrication is provided to gearbox 1. A difference between the two embodiments is that the hydraulic motor 22 driving fan 16 is incorporated in the same circuit 11 for circulating lubricant to and from the gearbox. Circuit 11 is split into a branch 11a and branch 11b. Branch 11a passes lubricant through heat-exchanger 14 (or bypass 24). Branch 11b circulates the lubricant towards first hydraulic motor 22 for powering fan 16, which provides cooling air. The hydraulic fluid for powering motor 22 is thus the same lubricant providing lubrication to the gearbox. Although not shown in FIG. 4, an additional filter may be provided in branch 11b. An advantage of this embodiment is that no other hydraulic fluid is needed.

Figure 5:
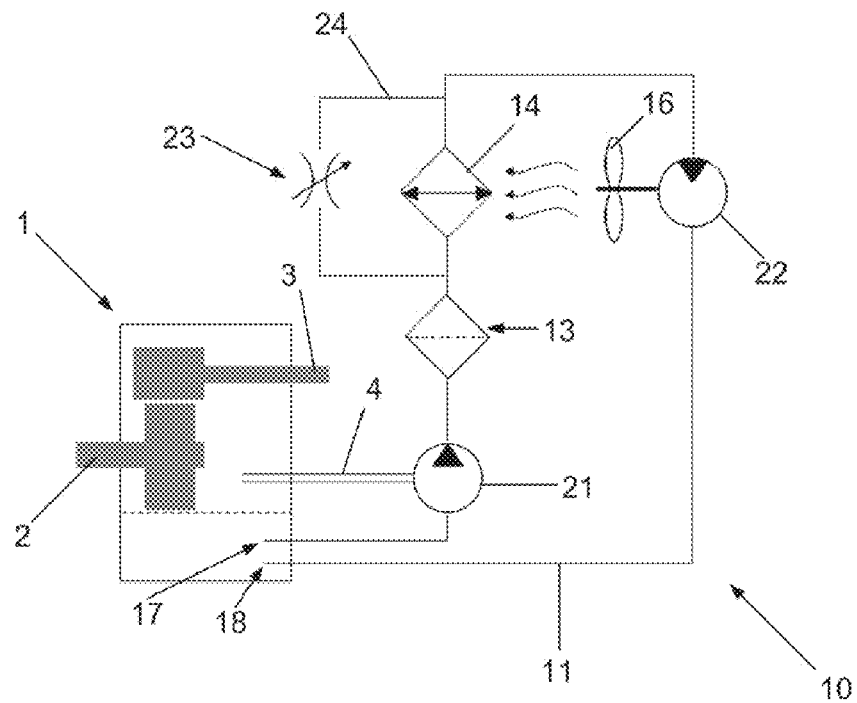
FIG. 5 shows a schematic representation of a third embodiment of a lubrication system according to the present invention.

FIG. 5 shows yet another embodiment of a hydraulic circuit according to the present invention. The same components have been indicated using the same reference signs. As in the embodiment shown in FIG. 4, the hydraulic motor 22 providing cooling of the lubricant via fan 16 is arranged in the same lubrication circuit 11 that circulates lubricant to and from the gearbox 1. However, in this embodiment a single head gear pump 21 is used to pump the lubricant and simultaneously power first motor 22. The circuit 11 is not divided in separate branches, which makes this embodiment relatively simple.

Figure 6:
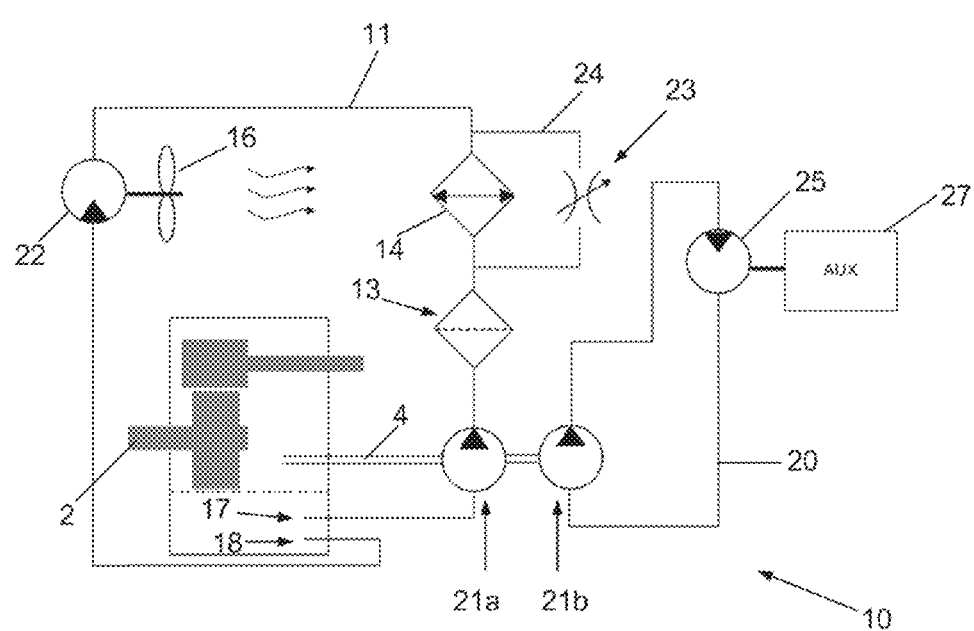
FIG. 6 shows a schematic representation of a fourth embodiment of a lubrication system according to the present invention.

The embodiment of the invention that is shown in FIG. 6 shows how the mechanical power from the pump 21 may be used for driving a cooler fan 16 and additional auxiliary system 27.

A double gear pump 21 is used. One section 21a of the pump is used for pumping lubricant to and from the gearbox through circuit 11. First hydraulic motor 22 for driving fan 16 is provided in this same circuit. Like in previous embodiments, the lubricant passes through heat exchanger 14, wherein it is cooled by the cooling air produced by fan 16. Like in previous embodiments, a bypass circuit 24 for bypassing the heat exchanger is provided.

The other section 21b pumps a hydraulic fluid through additional circuit 20, in which second hydraulic motor 25 is provided. Hydraulic motor 25 drives another auxiliary system 27. This auxiliary system may be the yaw system, de-icing system, lighting system, pitch system etc. The preferred auxiliary systems are systems that are only used as the wind turbine is rotating, since only then power is delivered through power-take-off 4. However, also using the power for other auxiliary systems, such as the yaw system, may be advantageous. The yaw system is used for orienting the rotor of the wind turbine in the prevailing wind direction. The yaw system however is not only used when the turbine is in operation. If the turbine has been idle and at the moment of start-up it is not oriented in the right direction, the yaw system is used for properly directing the rotor. At this moment however, no power is available from the power-take-off. A solution is that an additional power supply may be provided for these situations. Compared to prior art systems, this power supply for the yaw system can be smaller (thus lighter and cheaper), since it now only needs to provide power at specific moments, instead of constantly.

Figure 7:
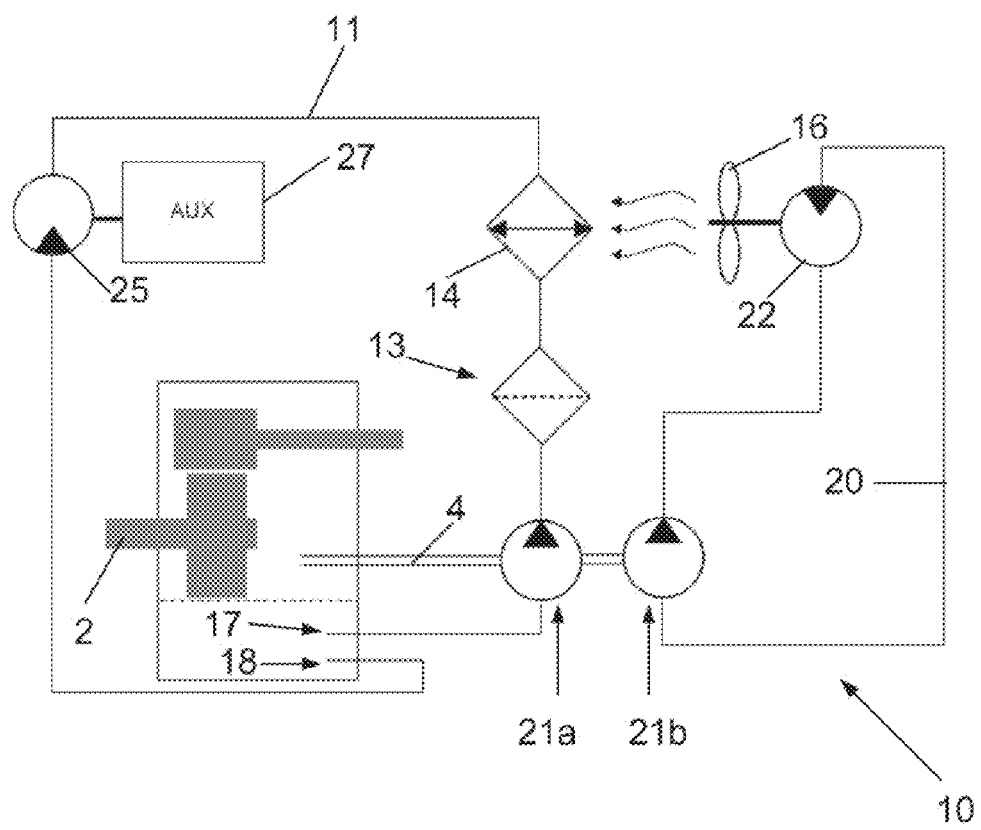
FIG. 7 shows a schematic representation of a fifth embodiment of a lubrication system according to the present invention.

FIG. 7 shows yet another embodiment, similar to the one shown in FIG. 6. A difference lies in the fact that first motor 22 for driving fan 16 is provided, not in the lubricant circuit 11, but in additional hydraulic circuit 20. Second motor 25 for driving a second auxiliary stem 27 is provided in lubricant circuit 11.

Another small difference is that no bypass circuit for bypassing heat exchanger 14 is provided in this embodiment. Within the scope of the invention, such a bypass circuit is optionally provided in all shown embodiments. On the one hand, such a bypass allows a more accurate control over the temperature of the lubricant. On the other hand, not providing a bypass circuit makes the circuit simpler.

Hydraulic motor 22 shown in all embodiments of the invention may be a positive displacement hydraulic motor or a rotodynamic hydraulic motor. A choice between these two types can be made on the basis of various parameters, such as the desired flow rate, the operating pressure and viscosity of the fluid used.

The embodiments shown before are merely illustrations of the principle of the invention. Other embodiments and configurations may be devised without departing from the scope of the appended claims.

In particular, the following options fall within the scope of the present invention:

Although not shown in any of the drawings, the present invention may also be applied to a so-called direct-drive wind turbine, in which the rotor shaft directly drives the generator (without interaction with a gearbox). In this type of wind turbines, a power-take-off may be arranged from the rotor shaft.

Although not shown in any of the drawings, lubrication may also be provided to other components than the gearbox, for example bearings.

Although the pump for pumping lubricant described in all embodiments was a gear pump, other types of pumps (positive displacement or rotodynamic pump), such as a piston pump, rotary vane pump, centrifugal pump, or axial flow pump.

And although in all embodiments shown in FIGS. 3-7, the pump for pumping lubricant drives a hydraulic motor which at least provides mechanical power to the lubricant cooling system, this is not necessarily the case. Within the scope of the present invention, it is possible that just one auxiliary system (e.g. de-icing system, yaw system) is powered, and the lubricant cooling system is not powered through the pump that pumps the lubricant. Within the scope of the present invention, other types of heat exchangers and/or cooling systems than the ones shown in the embodiments of FIGS. 3-7 may also be used.

In all embodiments of FIGS. 3-7, a single filter was provided in the lubrication circuit. Different filtering arrangements may also be used within the scope of the present invention. The skilled person will be able to determine, if a filter is needed and how many filters are needed, which kind of filter may be employed and in which part of the circuit the filters are most suitably provided.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method for lubricating a part in a wind turbine having a drive train, the method comprising:
    driving a pump by a power-take-off from the drive train,
    pumping a lubricant through a lubrication circuit using the pump,
    driving a first hydraulic motor using the pump, and
    the first hydraulic motor driving a lubricant cooling system.

2. The method according to claim 1, wherein the first hydraulic motor drives the lubricant cooling system with a variable speed.

3. The method according to claim 1, wherein the wind turbine comprises a gearbox and the power-take-off is a power-take-off from the gearbox.

4. The method according to claim 3, wherein the part to be lubricated is the gearbox.

5. The method according to claim 1, wherein the wind turbine is a direct-drive wind turbine and the power-take-off is a power-take-off from the rotor shaft.

6. The method according to claim 1, wherein the lubricant cooling system is a liquid-liquid heat exchanger or a liquid-air heat exchanger.

7. The method according to claim 6, wherein the lubricant cooling system is a liquid-air heat exchanger and the hydraulic motor drives a fan for cooling the lubricant.

8. The method according to claim 7, wherein the lubrication circuit furthermore comprises a bypass for bypassing lubricant around the liquid-air heat exchanger.

9. The method according to claim 8, wherein the bypass comprises a variable flow valve.

10. The method according to claim 6, wherein the first hydraulic motor drives the liquid-liquid heat exchanger or the liquid-air heat exchanger with a variable speed.

11. The method according to claim 1, wherein the first hydraulic motor providing mechanical power to the lubricant cooling system is arranged in the lubrication circuit.

12. The method according to claim 1, wherein the first hydraulic motor providing mechanical power to the lubricant cooling system is arranged in a separate circuit.

13. The method according to claim 12, wherein the pump for pumping lubricant is a single head gear pump.

14. The method according to claim 1, furthermore comprising the pump driving a second hydraulic motor, and
    the second hydraulic motor providing mechanical power to a wind turbine auxiliary component.

15. The method according to claim 14, wherein the first hydraulic motor is provided in the lubrication circuit, and the second hydraulic motor is provided in a separate circuit.

16. The method according to claim 14, wherein the pump for pumping lubricant is a double head gear pump.

17. The method according to claim 1, wherein the first hydraulic motor is a positive displacement or a rotodynamic hydraulic motor.

18. A method for lubricating a part in a wind turbine having a drive train, the method comprising:
    driving a pump by a power-take-off from the drive train,
    pumping a lubricant through a lubrication circuit using the pump, the lubrication circuit comprising a liquid-air heat exchanger,
    driving a first hydraulic motor using the pump, and
    the first hydraulic motor driving a fan for cooling the lubricant.

* * * * *